United States Patent [19]

Shokite

[11] 4,008,029
[45] Feb. 15, 1977

[54] MOLDING APPARATUS

[75] Inventor: Richard J. Shokite, Stratford, Conn.

[73] Assignee: Warnaco Inc., Bridgeport, Conn.

[22] Filed: Jan. 27, 1975

[21] Appl. No.: 544,404

[52] U.S. Cl. .............................. 425/157; 264/257; 264/322; 425/398; 425/412; 425/451.9

[51] Int. Cl.[2] ......................................... B29C 3/06

[58] Field of Search .......... 425/412, 389, 398, 290, 425/392, 455, 451.9, 400, DIG. 48, DIG. 127, DIG. 13, 387 R, 388, 169, 170, 157; 264/320, 321, 322, 257, 258, 292; 269/285; 249/160

[56] References Cited

UNITED STATES PATENTS

| 2,796,634 | 6/1957 | Chellis | 264/257 |
|---|---|---|---|
| 3,461,504 | 7/1969 | Becker et al. | 264/322 |
| 3,799,727 | 3/1974 | Howard | 425/398 |
| 3,880,561 | 4/1975 | Ferro | 425/398 |
| 3,891,377 | 6/1975 | Howard | 425/412 |

Primary Examiner—Robert L. Spicer, Jr.

[57] ABSTRACT

A method and apparatus for molding thermosetting and thermoplastic materials, particularly components of brassiere cups, enabling precise molding with a high degree of flexibility and control in the molding conditions of temperature, pressure and molding time. Two modes of molding are disclosed; a first mode in which the material is first clamped to the mold prior to conforming the medial portion of the mold to the mold blank; and a second mode in which the material is accommodated in the mold blank followed by clamping of the margins of the material.

8 Claims, 11 Drawing Figures

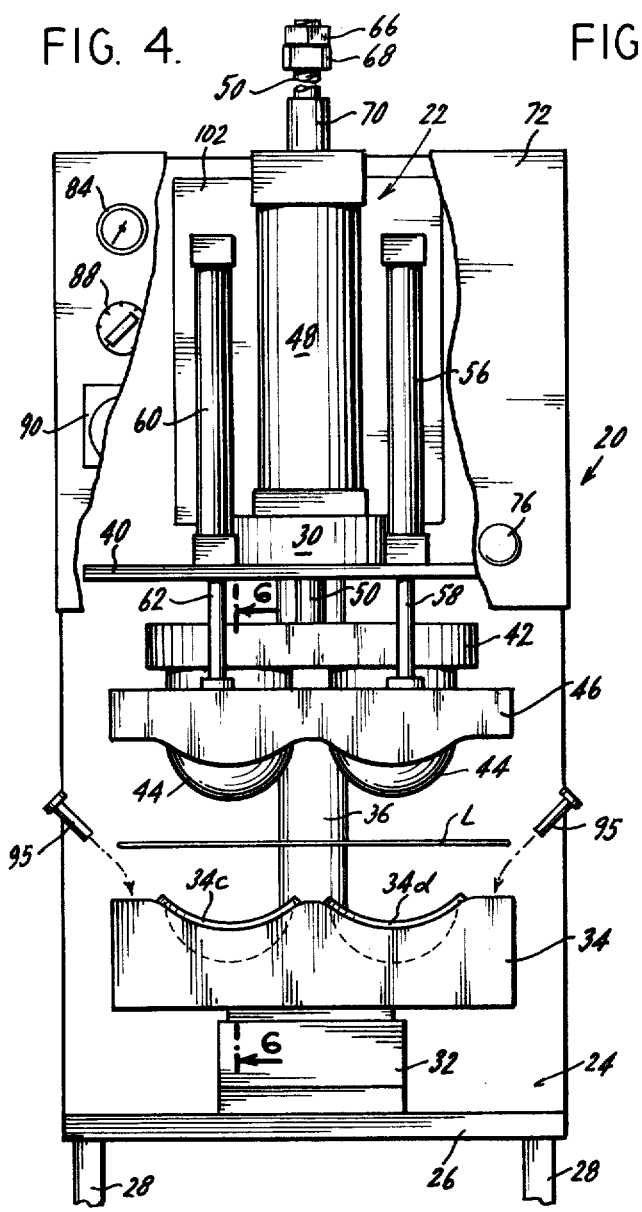
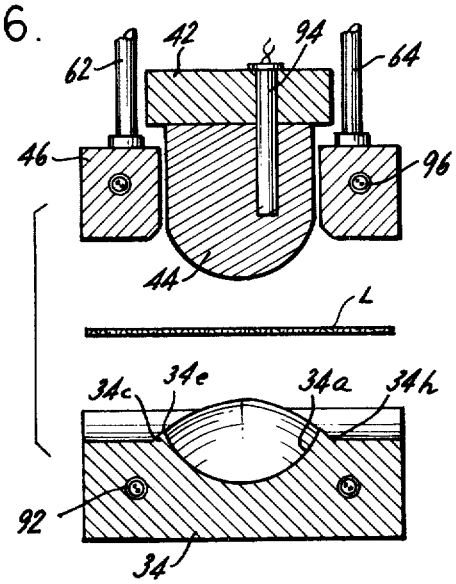
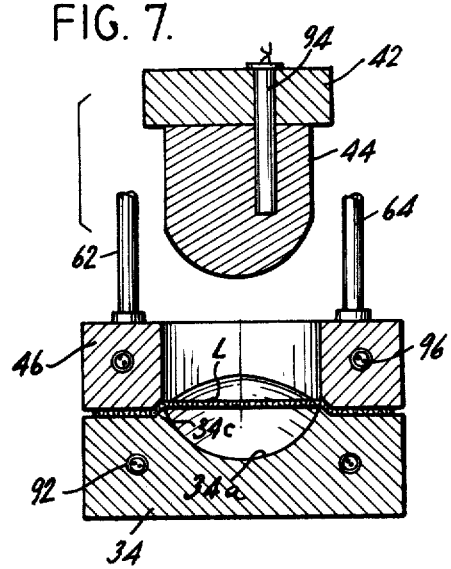
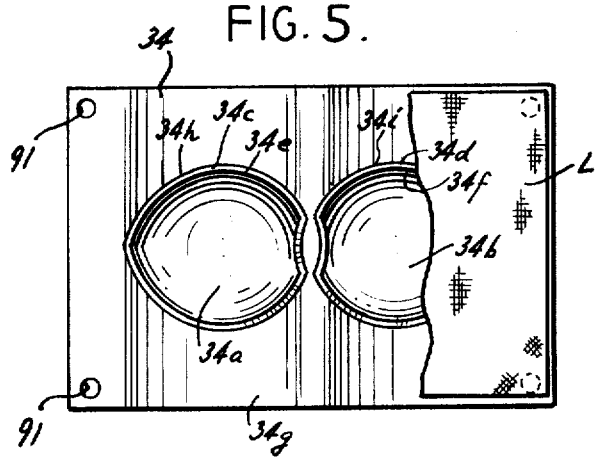
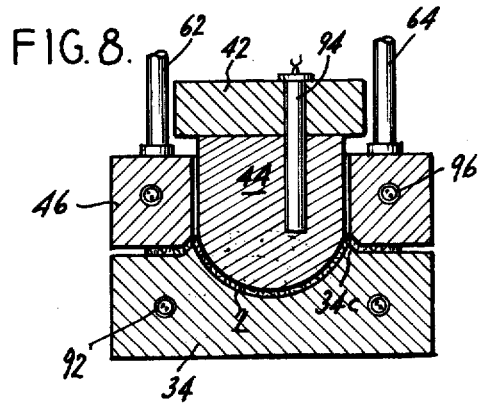

MOLDING APPARATUS

The present invention relates generally to apparatus and methods for the molding of thermosetting and thermoplastic materials and in particular to a machine for molding the components of brassiere cups and the like from various thermo-plastic material fabricated from natural and man-made fibers both in woven and nonwoven form and to improved methods for the manufacture of such molded products.

In the manufacture of brassieres and other garments which include formed bust cups, such as loungewear, bathing suits and the like, there has existed a need for improved equipment and methodology which facilitate the molding of several components of such molded products. Typically, in a brassiere, the molded components include a cover, filler and liner; and after separate molding of these three components, they are superimposed with the filler interposed between the cover and liner and are assembled in unitary relation, as by basting and stitching. A wide range of thermoplastic and thermosetting materials find useful application in the manufacture of such products, ranging from woven material of natural and man-made fibers and combination thereof to nonwoven materials, such as sheets of polyurethane and polyethylene foam.

In the mass production manufacture of such molded products, principally bust cups for brassieres and articles of wearing apparel, it would be highly desirable to have available equipments and methods enabling the serial and reproduceable manufacture of molded components, with the capability in such equipments and methods to precisely adjust, over relatively wide ranges, the important parameters for the molding of thermoplastic materials, namely, molding pressure, temperature and time. Precise control over such essential parameters and the ability to handle thermoplastic materials of varying thicknesses would lend substantial versatility to such equipments and methods; enable their utilization in the manufacture of a wide range of products of varying materials; and would result in more efficient, lower cost serial manufacture of such products.

Broadly, it is an object of the present invention to provide improved molding machines and methods which realize one or more of the aforesaid objectives. Specifically, it is within the contemplation of the present invention to provide improved molding apparatus and methods which provide for the controlled accommodation to the mold shape or cavity of the moldable material and in particular, which have the capability of establishing various molding cycles having infinitely controllable pressures, temperatures and molding times.

More particularly, it is an object of the present invention to provide apparatus and methods for the manufacture of molded breast or bust cups, typically for inclusion in brassieres, which are particularly suited or the mass production of such molded products to precisely controlled specifications and at relatively low unit costs.

It is a still further object of the invention to provide improved molding apparatus and methods for molding the separate components of the molded breast or bust cups in a single controlled molding cycle.

In accordance with apparatus aspects of the present invention, there is provided a machine for molding brassiere cups and like shapes from a moldable material which comprises a support carrying a first mold member, typically a female mold. A second mold member, usually in the form of a male mold, is mounted onto the support for movement into and out of molding relation to the first mold member. A holddown member is mounted on the support for movement into and out of a material-holding position relative to the first mold member. Provision is made for moving the holddown member into the material-holding position and for establishing a predetermined material-holding pressure on the moldable material in timed relation to the advance of the second mold member into molding relation to the first molding member. Means are provided which are operable in timed relation to the movement of the holddown member for moving the second mold member into molding relation to the first molding member and for establishing a predetermined molding pressure during a molding cycle. Advantageously, the material-holding pressure on the moldable material can be adjusted to hold the material for the subsequent molding operation yet permit controlled accommodation thereof into the mold cavity; and for certain materials and applications, it is possible to disable the holddown member to permit the moldable material to accommodate to the mold cavity without any pressure being exerted thereon, as for the example, in the molding of nonwoven foam typically utilized as a filler in the manufacture of brassiere cups.

In accordance with method aspects of the present invention, a blank of material which is moldable in response to the application of heat and pressure is oriented relative to an open mold having first and second mold members which cooperate with each other to define a molding cavity. The material blank is clamped against the molding member with a predetermined clamping pressure selected to hold the blank for subsequent molding and permitting controlled accommodation of the blank into the mold cavity. Thereafter, the mold is closed with the blank held between the mold members under the predetermined clamping pressure to conform the blank to the mold cavity; and heat and pressure are applied to the closed mold for a predetermined molding interval to mold the blank substantially into the shape of the mold cavity. As a variation of this method, particularly for the molding of fillers, as of an expanded foam, a foam blank is oriented relative to the open mold and the mold is closed to first accommodate the foam blank to the mold cavity. This is followed by the clamping of the margins of the blank against lateral displacement and the application of heat and pressure to the closed mold for a predetermined molding interval to mold the foam blank substantially in the shape of the mold cavity and to concurrently form a selvage around the shape molded into the foam blank. Typically, the selvage joins the molded shape along a sharply defined demarcation line utilized during subsequent cutting and stitching of the molded product into the final garment.

The above brief description, as well as further objects, features and advantages of the present invention will be more fully appreciated by reference to the following description of presently preferred apparatus and methods, when taken in conjunction with the accompanying drawings, wherein:

FIG. 4 is a front elevational view taken from the left of FIG. 1 with the control panel broken away, showing the representative station of the brassiere-molding machine of the present invention;

FIG. 5 is a top plan view of a representative female mold member for use in the illustrative molding machine;

FIG. 6 is a side sectional view taken substantially along the line 6—6 of FIG. 4 and looking in the direction of the arrows, showing the female mold, male mold and holddown members at the molding station, with the mold in the open position and the holddown member retracted relative to the female mold member at the start of a molding cycle;

FIG. 7 is a sectional view similar to FIG. 6 but showing the holddown member in its material-holding position relative to the material blank and to the female mold member as the molding cycle has progressed;

FIG. 8 is a sectional view similar to FIG. 7, but showing the mold at a later time in the molding cycle with the holddown member in the material-holding position and the male and female mold members in the closed molding position;

Figure 1:
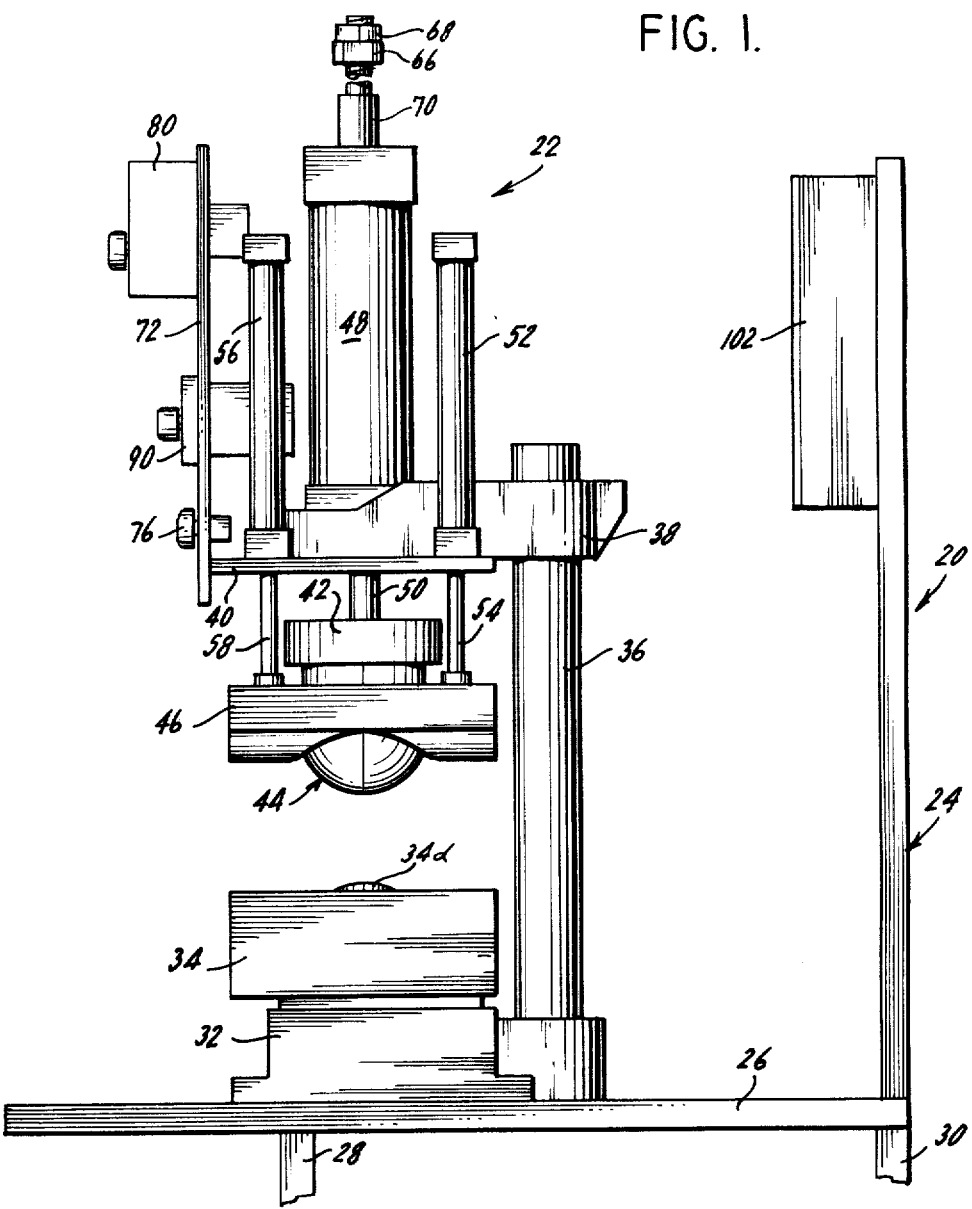
FIG. 1 is a side elevational view of one station of a typical machine for molding brassiere cups embodying features of the present invention.
Figure 2:
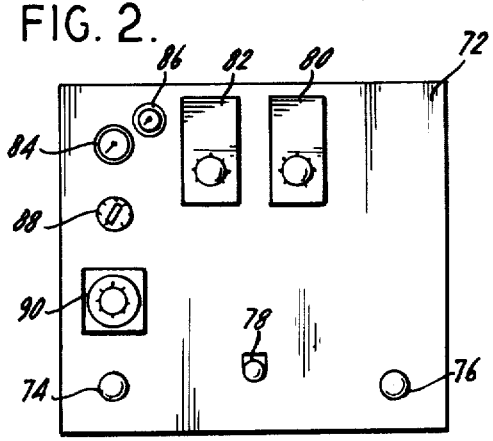
FIG. 2 is a front elevational view, on an enlarged scale, of the control panel for the one station of the machine.
Figure 3:
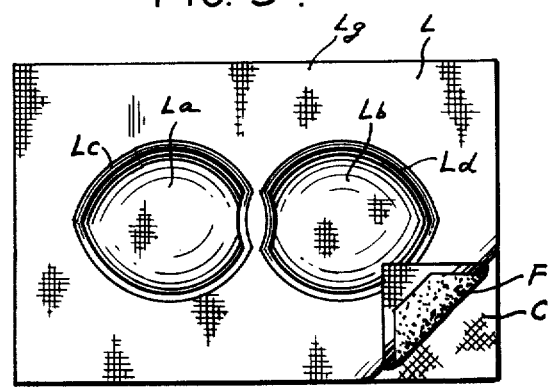
FIG. 3 is an inside plan view of several plies or blanks of moldable material superimposed after processing in accordance with the present invention.

Referring now specifically to the drawings, and in particular to FIGS. 1, 2, 4 and 5, there is shown a machine for molding brassiere cups and like shapes, generally designated by the reference numeral 20 which includes a multiplicity of side-by-side identical molding stations, one typical molding station being generally designated at 22. Conveniently, four stations substantially identical to molding station 22 may be provided in a bank for loading and unloading by a single operator. The molding machine 20 may be applied to the manufacture of a wide range of products, for example, and as shown in FIG. 3, the three molded components of a typical brassiere cup which is fabricated from a liner L, a cover C and a foam filler F interposed between the liner L and the cover C. After separate molding of these three components, the three plies for the brassiere cup are superimposed or juxtaposed, as shown in FIG. 3, cut, basted and ultimately incorporated into the final garment, be it a brassiere or other article of wearing apparel. Typically, the liner L and cover C may be fabricated of polyester tricot or nylon or other manmade or natural fibers while the filler F may be fabricated of a synthetic foam, or fiber fill.

The molding machine 20 includes a support or frame 24 which includes a horizontally-extending table 26 disposed at a level appropriate to orient the several molding stations 22 at the proper light for the operator; the table 22 being supported on an underframe including depending front and rear pairs of legs 28, 30. Molding station 22, which is representative of the plural side-by-side stations, includes female mold base 32 which is attached to the table 26 and on which is mounted the female mold member 34, the details of which are seen best in FIGS. 5 and 6. The female mold member 34 is seen to include spaced bust cup-forming cavities 34a, 34b, each in the desired concave shape for forming left and right bust cups, respectively. (Alternatively, only one bust-forming cavity need be provided in the mold and the right and left bust cups differentiated after molding by reversing one of the molded cups. However, the remainder of the description will be directed to two-cavity molding.) The cup-forming cavities 34a, 34b are bounded by selvage-forming rims 34c, 34d as seen best in FIGS. 5 and 6. At their respective inner peripheries, the selvage-forming rims 34c, 34d meet the cavity walls 34a, 34b at sharp edges 34e, 34f which ultimately will define the edges of the respective bust cups. The outer peripheries of the respective selvage-forming rims 34c, 34d meet the planar mold face 34g at junctions 34h, 34i to define the respective outer boundaries of the selvages for the molded cups. For the representative material blanks or plies shown in FIG. 3 (and partially shown at the right of FIG. 5), it will be seen that the corresponding molded blanks have corresponding sections conforming to the surfaces 34a, 34b, 34c, 34d and 34g of the female mold member 34. For example, for the liner L, the corresponding parts are the bust cups La, Lb, the surrounding selvages Lc, Ld and the remaining planar portion Lg of the liner blank.

Projecting upwardly from the table 26 rearwardly of the female mold member 34 and its base 32 is a support post 36 which carries cross head 38 and cross head plate 40 which overlie and are spaced above the female mold member 34. This superstructure movably mounts a male mold base 42, a male mold 44 and a holddown member 46 as well as the mounting and actuating mechanisms for the movable male mold 44 and holddown member 46 which coact with the female mold member 34 as will be subsequently described. Specifically, male mold member 44 and its base 42 are mounted for vertical reciprocal movement to bring the male mold member 44 into and out of molding relation to the female mold member 34 by a single pneumatically actuated piston and cylinder assembly including main cylinder 48 and piston 50. The manner in which this pneumatic actuating means 48, 50 control the movement of the male mold member 44 will be described in detail in conjunction with FIGS. 6–11 inclusive.

Additionally, the superstructure including cross head 38 and cross head plate 40 supports the pneumatic actuating means for the holddown member 46 which pneumatic actuating means includes three cylinder and piston assemblies 52, 54; 56, 58; 60, 62; and a fourth disposed behind piston and cylinder 60, 62, only the piston rod 64 of which is seen in FIGS. 6 and 7. The four cylinders are mounted on the cross head plate 40 in a substantially square array while their piston rods 54, 58, 62 and 64 project downwardly through the plate and are attached at four spaced locations to the holddown member 46 which surrounds and coacts with the male mold member 44 and the female mold member 34, as will be described.

Provision is made to enable setting the depth of mold or the final spacing between the female mold member 34 and the male mold member 46 when in the molding position. To this end, the main piston rod 50 carries two jam nuts 66, 68 which cooperate with stationary limit stop 70 at the upper end of the main cylinder 48. By initially adjusting the jam nut 66, 68 so that the male mold member 44 is permitted to bottom in the female mold member 34 and thereafter backing off the male mold member 44 and appropriately adjusting the jam nuts 66, 68 relative to each other and to the limit stop 70, it is possible to accurately preset the depth of mold for any given molding operation.

Figure 11:
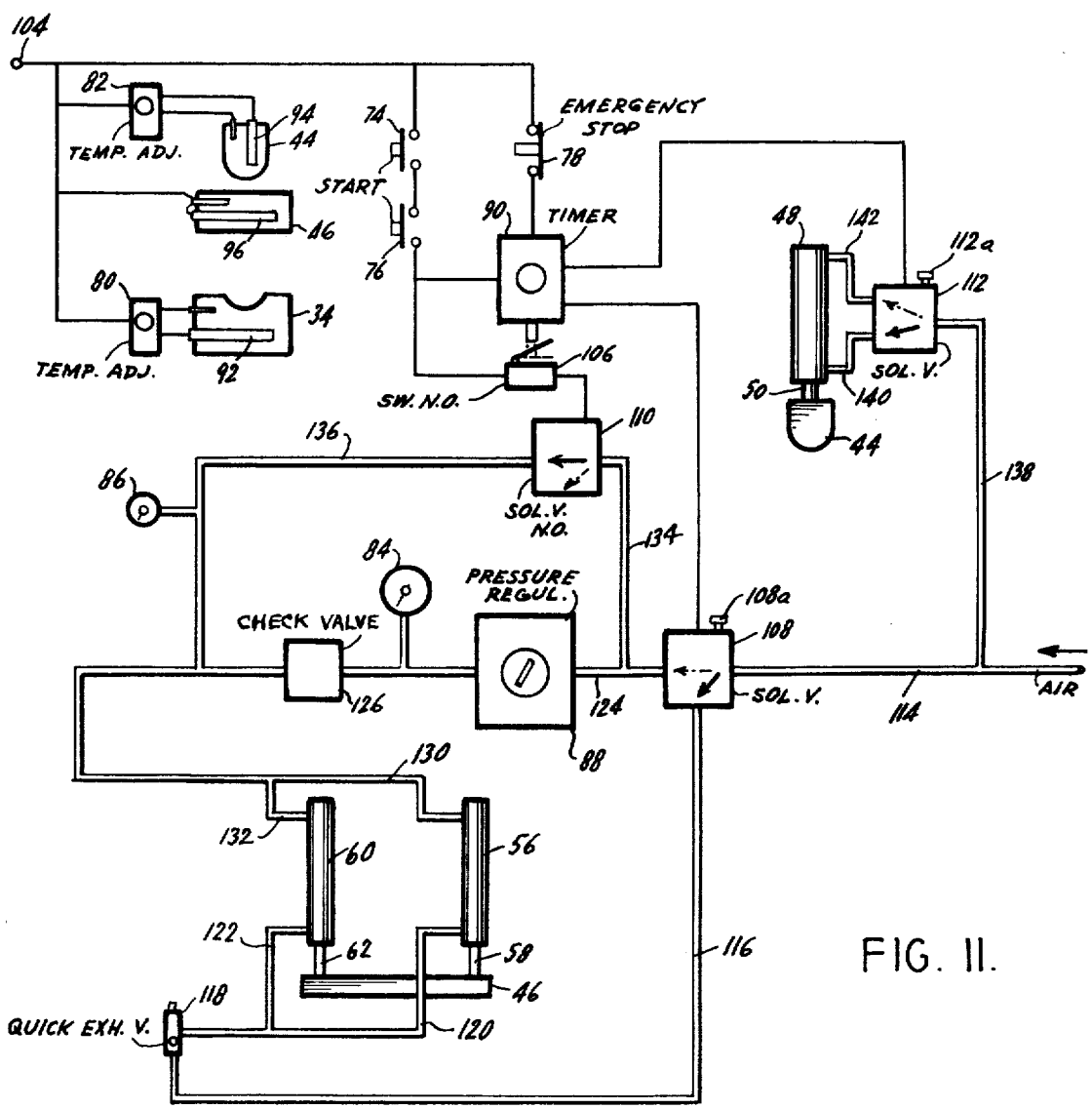
FIG. 11 is a combined schematic and diagrammatic view of a typical control for the brassiere-molding machine of the present invention.

Projecting upwardly from the cross head plate 40 at the front of station 22 is an operator control panel 72 which carries the necessary controls and gauges for the corresponding molding station 22 of the machine 20. These controls and gauges, best seen in FIG. 2, the functions of which will be described in detail in conjunction with FIG. 11, are as follows: start buttons 74, 76; stop button 78 (normally used only for emergency stops); an indicating-type temperature controller 80 for the female mold member 34; an indicatingtype temperature controller 82 for the movable male mold member 44; a first pressure gauge 84 which indicates operating pressure during one portion of the molding cycle; a second presssure gauge 86 which indicates molding pressure during another portion of the molding cycle; a pressure regulator 88 which is adjustable for different molding cycles; and a molding cycle timer 90 which is likewise adjustable for different molding cycles.

Temperature controller 80 controls electrical heaters 92 which are embedded in the female mold member 34; and temperature controller 82 similarly controls electrical heaters 94 which are embedded in the male mold member 44. Thus, accurately regulated and controlled heat may be applied to the female and male mold members 34, 44. Since it normally is not necessary to adjust the heating of the holddown member 46 during molding of most materials, for example those suitable for the manufacture of bust cups, heaters 96 for the holddown member 46 may simply be thermostatically controlled, as illustrated diagrammatically in FIG. 11.

With the foregoing overall description of the illustrative brassiere-molding machine 20, it will now be useful to make sequential reference to FIGS. 6–8 for a description of a typical sequence of operations for the three-part mold 34, 44, 46 which functions to control the amount of the moldable material (i.e., liner L) being fed or slipped into the mold. By so controlling the material blank, the three-part mold controls the stretch within the molded material blank to give uniform, reproducible and functional shapes. In operation, the male mold members or plugs 44 will feed the material blank into the mold cavities, with the holddown member 46 exerting the requisite drag or lateral pressure to ensure accurate restriction of the particular moldable material being processed in the machine. By this molding technique characterized by the controlled accommodation of the material blank relative to the mold cavity or cavities, it is possible to mold bust cups and like products under conditions which will assure that such bust cups will be capable of stretching at the apex thereof after molding; to mold with greater accuracy and reproducibility; and to mold materials which heretofore had not been capable of being molded, at least not with the requisite reproducibility for reliable serial manufacture. In FIG. 6, the three-part mold 34, 44, 46 is seen in its open or loading position wherein the male mold member 44 and the surrounding holddown member 46 are retracted relative to the female mold member 34 to enable the material blank, such as liner L, to be placed over the female mold member 34. Upon actuation of the pneumatic controls, as will be described, the molding cycle is initiated during which the holddown member 46 first moves into a materialclamping position, as shown in FIG. 7, wherein the material blank L is held under precisely controlled conditions for feeding the medial portions of the material, which in this illustrative embodiment form the bust cups L$a$, L$b$, into the corresponding mold cavities 34$a$, 34$b$. After the clamping of marginal portions of the material blank L, the male mold member 44 moves into the molding position in operative relation to the female mold member 34, as seen in FIG. 8, and the molding cycle proceeds to complete the molded blank as shown for example in the uppermost ply of FIG. 3. At the end of the molding cycle, the sequence of operations is reversed; the male mold member 44 and its movable mold base first move upward toward the opened position followed by retraction of the holddown member 46 to restore the threepart mold to the position illustrated in FIG. 6.

Figure 9:
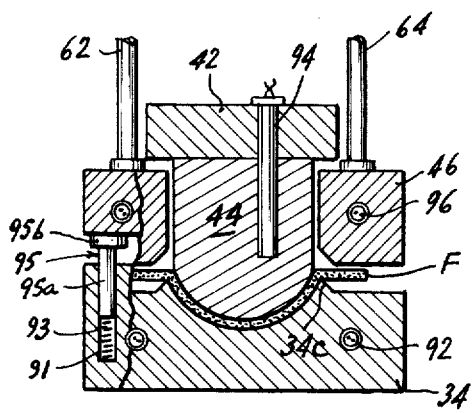
FIG. 9 is a sectional view similar to FIGS. 6–8, but showing the utilization of the three-part mold as adapted for the molding of foam fillers or the like wherein a standoff position is established for the holddown member in which it is held out of material-holding position during accommodation of the foam filler to the mold cavity.
Figure 10:
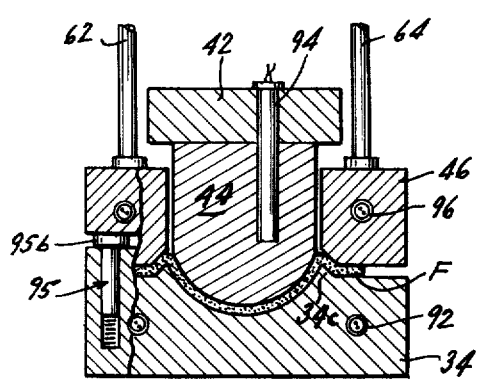
FIG. 10 is a sectional view similar to FIG. 9 showing the three-part mold in the molding position during a typical molding cycle for a foam filler.

For those applications in which it is desirable to have the material blank (i.e., foam blank F) accommodated in the mold cavity before clamping the margins thereof, to define the selvage around the shape molded into such blank, resilient standoff means are removably assembled with the female mold member as generally shown in FIG. 4 and as specifically shown in FIGS. 9 and 10. The removable and resilient standoff means include four pin mounting sockets, such as sockets 91 which are formed in the four corners of the female mold member 34 and which sockets open into the planar mold face 34$g$ defining the parting plane for the mold 34, 44. Each of these pin-mounting sockets 91 receives the two components of a resilient standoff means: a compressible spring 93 and a standoff pin 95 having a pin shank 95A received within the socket and a pin head 95B. The vertical standoff for holddown member 46 is selected to prevent holddown member 46 from exerting any marginal restraint on the foam filler F, as seen in FIG. 9, while the male mold member 44 is brought into engagement with the female mold member 34. After accommodation of the foam filler to the mold cavity defined by the female and male mold members 34, 44, as shown in FIG. 9, the application of a downward force on the holddown member 46, sufficient to overcome the oppositely directed force exerted by the spacer springs 93, brings the holddown member 46 to the material-holding position with a minimal clearance determined by the vertical dimension of the heads 95$b$ of the standoff pins 95 as seen in FIG. 10. Thus, when the standoff pins 95 are assembled within their respective pin-mounting sockets 91, the three-part mold 34, 44, 46 is arranged such that the materials or compositions being molded are first pressed into the cavity of the mold as the male mold member 44 moves into engagement with the female mold member 34, with the holddown member 46 being held in an offset position in which it is out of contact with the material and female mold member 34; and after this interval, the application of a predetermined pressure to the holddown member 46, compresses spacer springs 93 to bring the holddown member 46 into the materialclamping position in which it remains during the molding cycle, as shown in FIG. 10.

Reference will now be made to the combined schematic and diagrammatic showing in FIG. 11 of a typical control for the brassiere molding machine of the present invention. In FIG. 11, there is illustrated schematically and diagrammatically the several controls found on the operated control panel of FIG. 2 and the several mechanisms described in conjunction with a detailed description of the machine 20 shown principally in FIGS. 1 and 4–8 inclusive. To the extent that the controls or mechanisms are not elsewhere mounted on the machine, they may be conveniently incorporated into a control box 102 (see FIG. 1) mounted on the machine frame or chassis 24. In this illustrative control, an alternating current source 104 is connected via appropriate lines to the temperature controller 80 for the heating elements 92 of the female mold member 34; to the temperature controller 82 for the heaters 94 for the male mold member 44; and to the thermostatically controlled heaters 96 for the holddown member 46. Such temperature controllers and the manner of interconnection in this control are generally understood and require no further description, except to indicate that in typical equipment, such temperature controllers may be the type manufactured by Fenwal Incorporated of Ashland, Massachusetts as part of the Fenwal 500 line.

The alternating current source 104 is connected to a pair of manual start buttons 74, 76; to timer 90, and to a normally opened auxiliary switch 106 associated with timer 90. In normal operation, once the timer 90 is placed in operation, it times out to complete a molding cycle; however, emergency stop 78 connected to timer 90 is provided to abut a particular molding cycle under operator control, for example, in the event of an emergency. Timer 90 may be of the type manufactured by the Agasta Division of Amerace Esna of Elizabeth, New Jersey, for example, its 7000 series timing relay, which includes a normally open auxiliary switch 106 which transfers immediately when the relay coil of the timer 90 is operated and which is reset to its normally opened position prior to the end of a particular molding cycle as determined by the setting of the timer. Timer 90 is arranged at the start of a timing cycle to operate solenoid controlled valves 108, 110 and 112. Solenoid controlled valve 108 is connected at its input to the main air line 114 and in its normal or rest position connects the main air line 114 via branch line 116 and quick exhaust valve 118 to feeder lines 120, 122, etc. connected to the cylinder and piston assemblies (i.e., 56, 58 and 60, 62) for the holddown member 46. Thus, before the initiation of a molding cycle under control of the timer, solenoid controlled valve 108 applies air pressure from line 114 over lines 116, 120, 122 to maintain the holddown member in its retracted position shown in FIGS. 1, 4 and 6.

When activated by timer 90, the solenoid controlled valve 108 connects the main air line 114 to a second branch line 124 which is connected via pressure regulator 88, check valve 126, and feeder lines 130, 132 to the opposite ends of the four cylinder and piston assemblies for the holddown member 46. Thus, when solenoid controlled valve 108 is activated under control of timer 90, line pressures applied from main air line 114 over branch line 124 to the upper ends of the cylinder and piston assemblies for holddown member 46 move the holddown member 46 from its retracted or open position shown for example in FIG. 6 to its operative or material-clamping position shown for example in FIGS. 7 and 8. The clamping pressure exerted by the holddown member is determined by adjustment of the pressure regulator 88; and such clamping pressure is indicated on pressure gauge 84.

In advance of the pressure regulator 88 and following the solenoid controlled valve 108, branch line 124 is connected to a bypass line 134 which is connected to the input of normally opened solenoid controlled valve 110. The output line 136 from solenoid controlled valve 110 is connected via gauge 86 to check valve 126 and to feeder lines 130, 132 for establishing a high-pressure path through the pneumatic control for the holddown member 46. It would be appreciated that this high-pressure path is only provided when solenoid controlled valve 108 is operative and solenoid controlled valve 110 is inoperative. Initially, during the timing cycle, and for a preset time interval, solenoid controlled valve 110 is operated under the control of auxiliary switch 106 to block the high-pressure bypass provided by lines 134, 136; but at the point in the molding cycle when auxiliary switch 106 is restored to its normally opened position, the solenoid controlled valve is transferred to provide the relatively high pressure path for the pneumatic control of holddown member 46.

Solenoid controlled valve 112 for the main cylinder and piston 48, 50 for the male mold member 44 has its input side connected via branch line 138 to the main air line 114 and its two outputs via feeder lines 140, 142 to the lower and upper ends of the main cylinder 48 respectively. The solenoid controlled valve is initially ported to apply line pressure over lines 138, 140 to the lower end of the main cylinder 48 to normally position the male mold member 44 in the retracted or open position. Upon transfer of the solenoid controlled valve 112 at the start of a timing cycle, the line pressure is applied over branch line 138 and feeder line 142 to the upper end of the main cylinder 48 to move the male mold member 44 from its retracted position to its closed or operative position.

Solenoid controlled valves 108, 112 respectively have adjustable ports 108a, 112a which are adjusted to time the movement of the male mold member 44 and the holddown member 46 in relation to each other to establish the requisite sequence of motion of these two members relative to each other, i.e., movement of the holddown member 46 toward the material-clamping position in advance of the corresponding motion of the male mold member 44 to the material-molding position during their respective downward strokes; and conversely, retraction of the male mold member 44 in advance of retraction of the holddown member 46 as the three-part mold is moved to its open position.

During a typical molding cycle, after setting of the cycle timer 90 and the pressure regulator 88, the operator simultaneously presses the two start buttons 74, 76 which immediately transfers solenoid controlled valves 108, 110, 112 from their respective flow positions illustrated by the full line arrows to those illustrated by the dotted line arrows. By regulating adjustable ports 108a, 112a, and the provision of quick exhaust valve 118 on the downward side of the pneumatic control for the holddown member 46, the holddown member 46 is brought into the material-holding or clamping position as shown in FIG. 7 in advance of the male mold member 44 engaging the female mold member. The material is held with a preset clamping pressure which is lower than the pressure in the main air line 114 and which is established by the setting of the pressure regulator 88. This relatively low clamping pressure is maintained until such time as timer 90 restores the auxiliary switch 106 to its normally open position; at which time the solenoid controlled valve 110 transfers to its normal position, shown by the full line directional arrow thereby establishing a high pressure via main air line 114, solenoid controlled valve 108, bypass line 134, solenoid controlled valve 110 and branch line 136 and check valve 126 to cylinders 56, 60, etc. Check valve 126 serves to restrict the application of the line pressure on line 136 to the downstream side of pressure regulator 88. At the end of the molding cycle, timer 90 is operative to restore solenoid controlled valves 108, 112 to the positions indicated by the full line flow arrows, and the mold-opening sequence is initiated. During the upstroke of the male mold member 44 and of the holddown member 46, it is essential that the male mold member start up first, and this is accomplished by restricting the flow of air out of the exhaust ends of the four holddown cylinders and by adjusting the port 112a for the solenoid controlled valve 112 for the main cylinder 48.

Machine 20 operates in the same sequence during the molding of foam fillers or the like as has just been described except for the following changes: the standoff pins 95 are inserted in the pin-receiving sockets 91 on the female mold member 34a as shown in FIG. 9; the setting of pressure regulator 88 is such that the pressure applied to the pneumatic means for the holddown member 46 is only sufficient to move the holddown member to the standoff position illustrated in FIG. 9, but not to overcome the resistance of the springs 93 associated with the pins 95. The holddown member is maintained in the standoff position relative to the female mold member as shown in FIG. 9 and the filler blank F is allowed to slip into the female cavity until the timer permits the auxiliary switch 106 to be returned to its normally opened position and high pressure by-pass is established through solenoid controlled valve 108. At that time high pressure is applied to the cylinder and piston assemblies controlling holddown member 46 which causes the holddown member to overcome the spring resistance of springs 93 thereby moving holddown member 46 into its operative position mating with the female mold member 34, forming the sharp discontinuity about the molded foam cup as well as the selvage for the cup.

Typical settings for the molding of 100% polyester are: a main air pressure of 80 pounds per square inch; a molding cycle of 40 seconds plus or minus five seconds; and a mold temperature of 360° F. plus or minus 5°. The male mold member may be set to provide approximately ⅛ of an inch clearance between the male and female mold members when the male mold member is fully engaged in the female mold member; and the pneumatic system is set to provide an approximate five second time delay between engagement of the holddown member with the polyester fabric blank and contact of the male mold member with the fabric blank. It is essential that the requisite holddown pressure be set by regulator 88; and for this particular application, the pressure applied to the holddown member either over the pressure regulator 88 or over the bypass 134, 136 is the same. Care must be taken to avoid having the male mold member engage the polyester blank before the holddown member has engaged the polyester blank to avoid feeding excess material into the mold which will result in variations in cup depth from one molding to the next. The molding cycle should be established to assure that the material will be subjected to the heat and pressure for the requisite period of time; and an improper molding cycle will result in an imperfect set of the molded cup. Minor excesses in molding intervals are not deleterious, but do decrease productivity. Temperature control is important and as higher temperatures are used, the polyester fabric blank will come closer to a plastic state and could result in a relatively hard cup. Insufficient molding temperatures, of course, will result in improper setting of the molded cup.

In molding of a foam filler or blank, for example, a single ply of approximately ¼ of an inch thickness, the pressure on the main air line 114 is once again established at 80 pounds per square inch while pressure regulator 88 is set to provide an air pressure sufficient to bring the holddown member to the standoff position (see FIG. 9) but insufficient to overcome the reaction force provided by the spacer springs 93. Cycle times can be approximately the same and the temperature will be set in accordance with the particular foam. For example, a temperature of 415° F plus or minus 5° is appropriate for the molding of blanks fabricated of foam. The male mold member may be initially set to bottom out approximately ⅛ of an inch above the female mold member; and the descent of the male mold member may be delayed five seconds as compared to the advance of the holddown member. The pressure set by regulator 88 is sufficient to establish the down stroke for the holddown member to come into a rest position on the spring-mounted standoff pins 95 without depressing such pins prior to the engagement of the male mold member 44 with the female mold member 34 as shown in FIG. 10. Typically, pressure settings of less than 20 pounds per square inch have been found appropriate for bringing the holddown member to the standoff position; operation of the solenoid controlled bypass valve 110 under the control of auxiliary switch 106 is then effective to apply full material-clamping pressure to the holddown member to move the holddown member from the standoff position shown in FIG. 9 to the molding position shown in FIG. 10.

From the foregoing, it will appreciated that there has been provided in accordance with the present invention improved molding apparatus and methods which enable the precise molding of a wide range of materials with a high degree of flexibility in the essential molding conditions which are temperature, pressure and molding time. The apparatus is suitable for operation in a first mode in which the material blank is clamped under a controlled pressure prior to confirmation of the medial portion thereof to the mold cavity or in a second mode in which the material blank is accommodated to the mold cavity followed by clamping of the margins thereof. Upon completion of the molding cycle, the molded product is sharply bounded by a line of demarcation which defines the molded product; and this sharp line of demarcation is in turn surrounded by a well defined selvage. Although the foregoing description has been particularly directed toward the molding of cups for brassieres, it will be appreciated that the present apparatus and methods find application in the molding of diverse products where it is desirable to accurately control the feed of preformed sheets and blanks of material in relation to a mold cavity, followed by the molding thereof under highly controllable conditions of temperature, pressure and time.

What I claim is:

1. A machine for molding brassiere cups and like shapes from a moldable material comprising a support, a first mold member on said support, a second mold member, means mounting said second mold member on said support for movement into and out of a molding position to said first mold member, a holddown member, means mounting said holddown member on said support for movement into and out of a material-holding position relative to said first mold member, first pneumatic means for moving said holddown member into said material-holding position, second pneumatic means for moving said second mold member into said molding position relative to said first mold member and a control for said first and second pneumatic means including a source of air under pressure, means including a first solenoid controlled valve and an adjustable pressure regulator for establishing a first relatively low pressure line between said source and said first pneumatic means, means including a second solenoid controlled valve establishing a second relatively high pressure line between said source and said first pneumatic means, means including a third solenoid controlled valve for establishing a third relatively high pressure line between said source and said second pneumatic means, an adjustable timer, means responsive to the initiation of a timing cycle by said timer for actuating said first and third solenoid controlled valves to move said holddown member into said material-holding position under the low pressure established by said adjustable pressure regulator in timed relation to the movement of said second mold member into said molding position in mating relation with said first mold member, means operable after the elapse of a present and adjustable interval of said timing cycle to actuate said second solenoid controlled valve to apply high pressure to said first pneumatic means for the remainder of said timing cycle and means responsive to the termination of said timing cycle for moving said holddown member and said second mold member in timed relation relative to each other out of said material-clamping and molding positions relative to said first mold member.

2. A machine according to claim 1 including heater means in said holddown member.

3. A machine for molding brassiere cups and like shapes from a moldable material comprising a support, a first mold member on said support, a second mold member, means mounting said second mold member on said support for movement into and out of a molding position relative to said first mold member, a holddown member, means mounting said holddown member on said support for movement into and out of a material-holding position relative to said first mold member, first pneumatically operable means for moving said holddown member into and out of said material-holding position, second pneumatically operable means operable in timed relation to said first pneumatically operable means for moving said second mold member into said molding position relative to said first mold member and for maintaining a predetermined molding pressure during a molding cycle, resilient standoff means removably mounted on said first mold member and engaging said holddown member when the latter is moved toward said material-holding position to establish a standoff position for said holddown member spaced from said first mold member, said resilient standoff means being constructed and arranged to be compressible and to enable said holddown member to move into said material-clamping position, and means for applying air pressure to said first pneumatically operable means at a pressure level sufficient during a first time interval to move said holddown member into standoff position and for thereafter applying air pressure to said pneumatically operable means at a higher pressure level during a second time interval sufficient to compress said resilient standoff means and move said holddown member into said material-holding position during said second time interval.

4. A machine according to claim 3 wherein said first mold member includes a plurality of pin-mounting sockets and said resilient standoff means includes a corresponding plurality of compressible springs and standoff pins removably mounted in said pin-mounting sockets.

5. A machine according to claim 4 wherein each of said standoff pins includes a shank mounted in said pin-mounting socket and a head extending from said socket and establishing a preset clearance between said holddown member and said first mold member when the former is in said material-clamping position.

6. A machine for molding brassiere cups and like shapes from a moldable material comprising a support, a first mold member on said support, a second mold member, means mounting said second mold member on said support for movement into and out of molding relation to said first mold member, a holddown member, means mounting said holddown member on said support for movement into and out of a material-holding position relative to said first mold member, means for moving said holddown member into said material-holding position and establishing a predetermined material-holding pressure on the moldable material in timed relation to the advance of said second mold member into molding relation to said first mold member and means operable in timed relation to the movement of said holddown member for moving said second mold member into molding relation to said first mold member prior to the engagement of said moldable material by said holddown member and for establishing a predetermined molding pressure during a molding cycle.

7. A machine according to claim 6 further including heater means in said holddown member and adjustable temperature control for said heater means.

8. A machine for molding brassiere cups and like shapes from a moldable material comprising a support, a first mold member on said support, a second mold member, means mounting said second mold member on said support for movement into and out of molding relation to said first mold member, a holddown member, means mounting said holddown member on said support for movement into and out of a material-holding position relative to said first mold member, first, second and third heater means in said first and second mold members and said holddown member respectively, first, second and third adjustable temperature controls for said first, second and third heater means respectively, first pneumatic means for moving said holddown member into said material-holding position, second pneumatic means for moving said second mold member into a molding position relative to said first molding member and a control for said first and second pneumatic means including a source of air under pressure, means including a first solenoid controlled valve and an adjustable pressure regulator for establishing a first relatively low pressure line between said source and said first pneumatic means, means including a second solenoid controlled valve establishing a second relatively high pressure line between said source and said first pneumatic means, means including a third solenoid controlled valve for establishing a third relatively high pressure line between said source and said second pneumatic means, an adjustable timer, means responsive to the initiation of a timing cycle by said timer for actuating said first and third solenoid controlled valves to move said holddown member relative to said first mold member and to thereafter move said second mold member into mating relation with said first mold member and means operable after the elapse of a preset and adjustable interval of said timing cycle to actuate said second solenoid controlled valve to apply high pressure to said first pneumatic means for the remainder of said timing cycle.

* * * * *